United States Patent [19]
Adler

[11] 3,715,524
[45] Feb. 6, 1973

[54] ELECTRO-OPTICAL GROOVE TRACKING APPARATUS FOR VIDEO REPRODUCING SYSTEM

[75] Inventor: Robert Adler, Northfield, Ill.

[73] Assignee: Zenith Radio Corporation, Chicago, Ill.

[22] Filed: April 20, 1972

[21] Appl. No.: 246,048

[52] U.S. Cl....179/100.3 V, 178/6.7 A, 179/100.3 B, 250/202, 250/219 DD
[51] Int. Cl..........G11b 7/14, G11b 7/18, G11b 7/24
[58] Field of Search ................179/100.3 V, 100.3 B; 178/6.7 R, 6.7 A; 250/201, 202, 219 Q, 219 QA, 219 FT, 219 D, 219 DD, 219 DR; 340/173 LM

[56] References Cited

UNITED STATES PATENTS

| | | | |
|---|---|---|---|
| 3,530,258 | 9/1970 | Gregg | 179/100.3 V |
| 3,673,412 | 6/1972 | Olson | 179/100.3 V |
| 3,454,777 | 7/1969 | Marcus | 250/219 DD |
| 3,361,873 | 1/1968 | Johnson | 179/100.3 V |
| 3,391,255 | 7/1968 | Gregg | 179/100.3 V |
| 3,245,307 | 4/1966 | Lang | 250/219 D |

*Primary Examiner*—Raymond F. Cardillo, Jr.
*Attorney*—John H. Coult et al.

[57] ABSTRACT

Video information is stored optically along a helical track on a rotating disc over which an optical pick-up moves radially in correspondence with progressive displacement of a monitored portion of the track. To maintain constant alignment between the pick-up and the track regardless of deviations in the intended radial progression of either, a control signal is applied to an electromechanical transducer in order to vary the position of the pick-up transversely relative to the monitored track portion. Spaced parallel from the disc is a mask to span a plurality of track segments. All of the slits are oriented generally along those segments, and the number of slits is slightly different from the number of the segments in the width of the span. A generally collimated beam of light is projected through the slits and the portion of the disc which carries the segment. A balanced photodetector system responds to a moire' pattern in the light which is projected through both the slits and the disc portion in order to develop a pair of signals which represent relative departure of the pick-up laterally from the monitored track length. A differential amplifier combines these signals into a control signal which is applied to the transducer to effect a compensatory variation in the position of the pick-up.

5 Claims, 6 Drawing Figures

ELECTRO-OPTICAL GROOVE TRACKING APPARATUS FOR VIDEO REPRODUCING SYSTEM

The present invention pertains to a video reproducing system. More particularly, it relates to guidance apparatus for use in such a system in which video information is optically stored in a helical track on a disc.

Significant effort has been devoted to the development of systems for recording and later reproducing video information stored optically in a helical track upon the surface of a rotating disc. The information is stored photographically so as to be represented along the length of track as variations in opacity or reflectivity. In a typical optical disc recording system, the spacings between adjacent segments of the helical track and the track widths are extremely small. For example, there may be three adjacent track convolutions per mil with the track width being such that it is necessary to focus the read-out beam of light which probes the track to a spot having a diameter of only about two microns. Moreover, in order to utilize the high degree of resolution of which optical disc recordings are capable, it is necessary to rotate the disc at a high speed such as, for example, 1,800 revolutions per minute.

Such fine dimensions and high speeds demand great precision in the maintenance of alignment between the optical pick-up in the reproduction system and the portion of the track it monitors. In practice, distortions in the record as produced may result in an eccentricity in the track of several track spacings. It thus becomes necessary to include radial guidance apparatus in order to keep the pick-up properly aligned relative to the track. In principle, it is possible to include a servo system which derives radial positioning information directly from the relationship between the track and the light spot focused thereon by the pick-up for the purpose of reading out the stored video information. From a practical standpoint, however, such a direct approach is both cumbersome and expensive.

It is, accordingly, a general object of the present invention to provide a new and improved video reproducing system of the optical disc recording type which is capable of overcoming the aforenoted deficiencies.

A particular object of the present invention is to provide such a video reproducing system that affords fast response with a high degree of precision while yet requiring relatively few additional components.

Accordingly, the invention is included in a video reproducing system wherein video information is stored optically along a helical track on a rotating disc, and an optical pick-up is moved radially of the disc in correspondence with progressive, generally uniform radial displacement of a monitored portion of the track. Adjusting means responds to a control signal by varying the position of the pick-up transversely relative to the monitored track portion. Spaced parallel from the disc is a mask physically linked to the pick-up and which has a plurality of optical slits laterally spaced apart to span a plurality of track segments. All of these slits are oriented generally along those segments. Moreover, the number of the slits is slightly different from the number of the segments in the spanned width. A generally collimated beam of light is projected through the slits and the region of the disc which carries the segments. Detection means responds to a moire' pattern in the light projected through both the slits and the disc region by developing signals that represent relative departure of the pick-up radially from the monitored portion of the track. In response to those signals, the control signal is developed in a manner that effects a compensatory variation in the position of the optical pick-up.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2, 3:
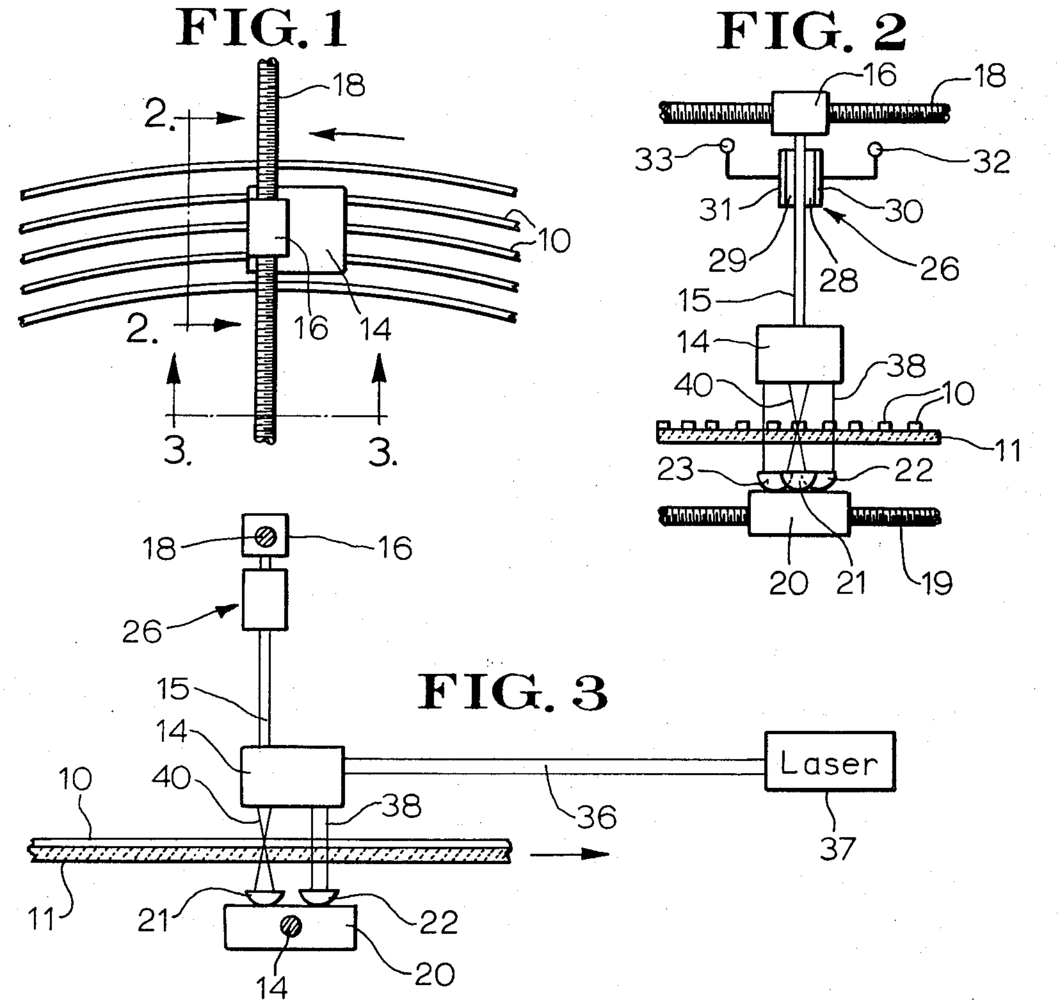
FIG. 1 is a fragmentary plan view of a video reproducing system.
FIG. 2 is a fragmentary cross-sectional view taken along the line 2—2 in FIG. 1.
FIG. 3 is a fragmentary cross-sectional view taken along the line 3—3 in FIG. 1.

As indicated in the introduction, the typical dimensions between adjacent segments of the helical track in an optical disc recording are minute. It will be appreciated, therefore, that it has been necessary in the drawings to exaggerate greatly some of the dimensions illustrated. FIG. 1 depicts a plurality of adjacent recorded track segments 10 formed on a disc 11 (FIGS. 2 and 3). Track segments 10 are portions of what in totality constitutes a continuous helical track analogous to the helical groove of a standard disc-type audio recording. In a manner known, as such, disc 11 is coated with a photosensitive emulsion. The recording process involves exposing the sensitized disc surface to a sharply focused beam of light, with the intensity of the beam being modulated in accordance with the video information to be recorded, either directly or through an encoding device such as a frequency modulator. As the disc is rotated, the beam source is moved radially of the disc so as to record the video information in a helical track. The result, after development by conventional photographic techniques, is the fixing of variations of intensity along the length of the helical track in correspondence with variations in the applied signal. To play back or read out the recorded information, a similarly focused beam of light is either transmitted through the moving track or reflected therefrom to a photodetector. As a result of the differences in density along the track, the photodetector senses either variations in transmission of the light through the track or variations in reflection of the light from the track in order to develop an electrical signal which then is utilized, directly or through a decoding device such as a frequency discriminator, to modulate the brightness in an image display.

In principle, the amplitude-varying video information may be recorded directly along the track. That is, a very dense or "black" portion of the track may correspond to a black region in the image to be reproduced, while a low-density or "white" portion of the track correspondingly represents a white region in the image. Of course, the relationships as between the density in the recording and the shade in the image to be reproduced may be reversed, if desired. In any event, the usual modulation percentages employed are such that the track is never completely without some density, that is, it is never completely white. Consequently, the track is always visible.

Such recording of the video information in terms of its direct amplitude often is undesirable in that the system exhibits substantial sensitivity to noise. The latter results in undesired brightness variations over a large area that is intended to have constant brightness. Consequently, a preferred approach is that of first converting the amplitude-modulated video signal into frequency modulation. In this case, a frequency at one end of a frequency range would correspond to black, while the frequency at the other end of that range would correspond to white. The intervening frequencies would correspond to varying shades of gray. Analogously, the different frequencies throughout the range might correspond to a corresponding range of saturation of a color. In any event, large areas of constant characteristic, such as constant brightness, are represented in the recording as a constant frequency signal. On average throughout the track, the intensity is representative of a gray value corresponding to 50 per cent frequency modulation.

As already indicated, the informational read-out process may involve either light transmission through the recorded track or reflection of light therefrom. As herein specifically illustrated, the transmission mode is utilized and disc 11 may be of any suitable light-transparent material such as glass or, preferably, vinyl. Thus, the system includes a light projection head 14 suspended by a stem 15 from a nut 16 that travels on a rotating lead screw 18. Lead screw 18 is oriented radially of the helical track so as to move projection head 14 radially of disc 11, and the thread pitch of the lead screw and nut is such that the movement is in correspondence with the progressive generally uniform radial displacement of the length of track immediately beneath the center of the projection head. Parallel to and spaced on the other side of disc 11 from lead screw 18 is another lead screw 19 which similarly carries a nut 20. Affixed to nut 20 is a video photodetector 21 and a pair of balanced photodetectors 22 and 23 all of which are located so as to receive respective quantities of light projected from head 14 through disc 11 and either through a monitored portion of track or through the transparent spaces between its included track segments 10. Disc 11 is in itself transparent to the light from beam 36 so as to constitute a plurality of sections highly transmissive to the light that are located respectively between each successive track segment. Lead screws 18 and 19 and nuts 16 and 20 are threaded alike and the two lead screws rotate at the same rate so that the two nuts travel in synchronism with each other. Thus, projection head 14 and photodetector 21 together constitute an optical pick-up the totality of which is moved radially of disc 11 in correspondence with the radial displacement of the interposed portion of the helical track which is being monitored by photodetector 21. It will be recognized that a single lead screw may replace the two that are illustrated. In that case, photodetectors 21–23 are carried upon the end of a multiply-bent arm which depends from nut 16 around the edge of disc 11, or vice versa.

Stem 15 exhibits lateral flexibility in the direction radially of track segments 10. Sandwiched about a portion of stem 15 is an electro-mechanical transducer 26 capable of responding to a control signal by exhibiting flexure that, in turn, varies the position of projection head 14 transversely relative to the portion of track being monitored by the optical pick-up system. In this case, transducer 26 is composed of a pair of oppositely poled piezoelectric slabs 28 and 29 disposed on opposite sides of stem 15 and in turn sandwiched between a pair of electrodes 30 and 31 connected respectively to terminals 32 and 33.

Entering projection head 14 is a beam 36 of substantially collimated light that arrives along a path generally parallel to disc 11 and produced by a laser 37. Within projection head 14, a first portion of the light from beam 36 is directed downwardly as a guidance beam 38 that is transmitted through a region of disc 11, which carries several adjacent segments 10 of the helical track, after which it is received by photodetectors 22 and 23. Another portion 40 of the light from incoming beam 36 is sharply focused upon a directly underlying portion of the helical track being monitored. After transmission through the track and the underlying region of disc 11, portion 40 is received by photodetector 21.

Figure 4:
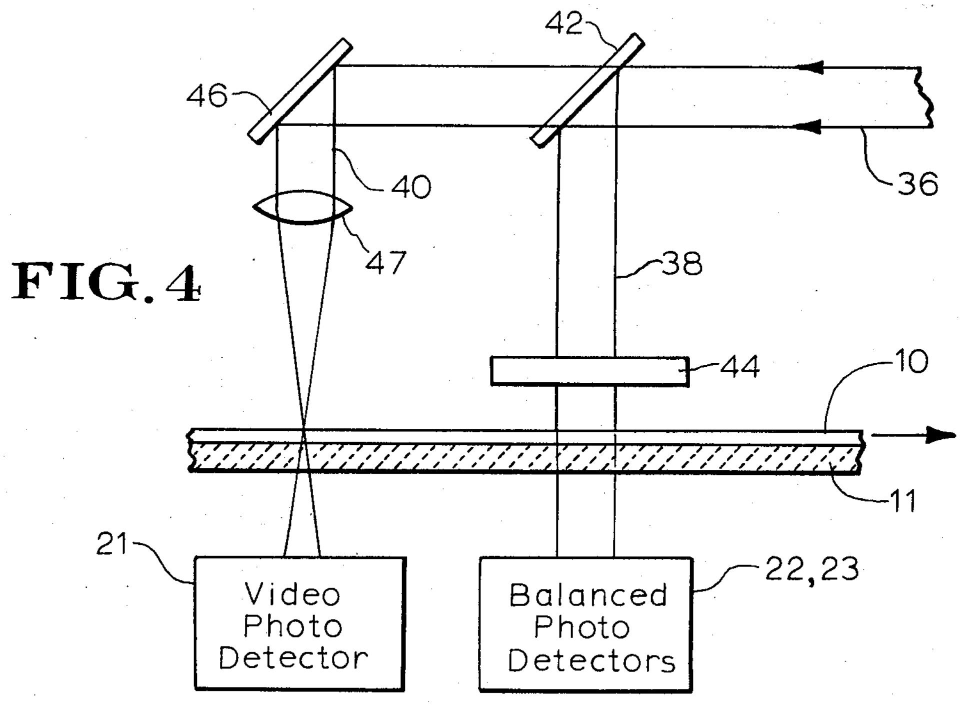
FIG. 4 is a schematic representation, partially in block diagram form, of a portion of the apparatus in FIGS. 1-3 and oriented the same as in the cross section of FIG. 3.

As represented in more detail in FIG. 4, beam 36 is thus spatially aligned with both video photodetector 21 and balanced photodetectors 22 and 23. On entering projection head 14, portion 38 of beam 36 is first reflected downwardly by a partially reflective mirror 42 through a mask 44 and then on through a region of disc 11, that carries several adjacent track segments, and into balanced photodetectors 22 and 23. The other portion 40 of beam 36 is similarly directed downwardly by a prism or mirror 46 through a convergent lens 47 into a highly focused spot on the portion of the track to be monitored. After passage through that monitored portion of track and disc 11, the transmitted light is received by video photodetector 21.

Figure 5:
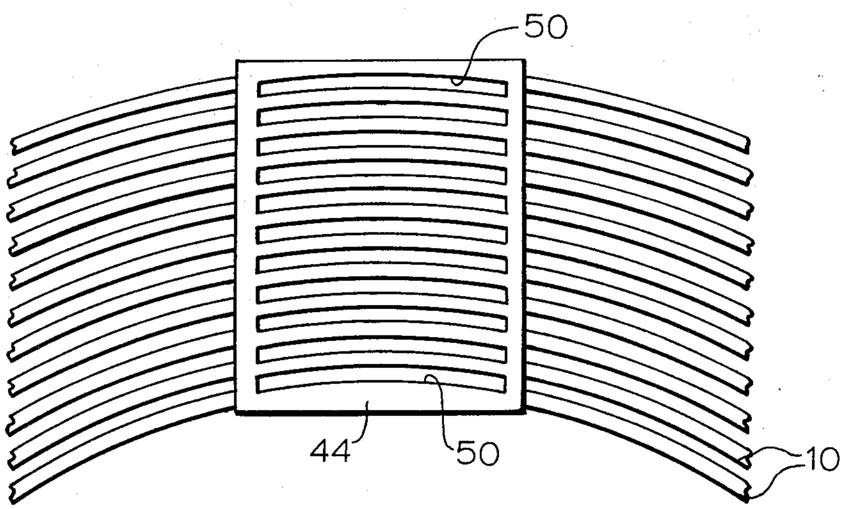
FIG. 5 is an enlarged fragmentary plan view of a portion of the apparatus in the preceding figures.

Mask 44 is parallel to and spaced above disc 11. As shown in FIG. 5, the mask includes a plurality of optical slits 50 that are laterally spaced apart to span a plurality of segments 10 of the track. In itself, mask 44 may be in the form of a sheet of light-opaque material having slits 50 cut through the sheet or it may be in the form of a continuous substrate having alternate opaque and transparent portions. All of slits 50 are oriented generally along segments 10. Since the outermost convolution of the total helical track has a larger radius than the innermost convolution and yet since it is desired to arrange slits 50 so as to be generally in alignment with the underlying track segments the radius of the slits preferably approximates the average radius of the track convolutions. Most importantly, the number of slits 50 is slightly different from the number of track segments spanned by the slits in mask 44.

In operation, the light which is received by photodetectors 22 and 23 thus is received by the latter only after passing through both slits 50 and the transparent sections of disc 11 between track segments 10. As seen by photodetectors 22 and 23, the small difference between the spacing of slits 50 and the spacing of track segments 10 results in one or more localized stripes of bands of light and shadow. As such, this is called moire' effect, and it has long been known. It may be simply observed in a crude experiment by placing two ordinary pocket combs of similar but not equal construction side-by-side and then moving one relative to the other while looking through the combs toward a light area. It will be noted that a dark stripe (or stripes) moves laterally of the comb teeth at a rate much greater than the actual relative physical movement between the combs themselves.

Most significantly, any slight radial displacement of mask 44 relative to the underlying track segments 10 results in a greatly magnified movement of such stripes of light and shadow as seen by photodetectors 22 and 23. Assuming, for example, that 11 of slits 50 in mask 44 span 10 of track segments 10 on disc 11, relative movement of mask 44 by only one track width results in movement of a dark stripe by ten track widths. Thus, photodetectors 22 and 23 are exposed to a brightness variation which not only represents relative departure of the optical pick-up assembly radially from its monitored track portion, but the radial movement of the brightness variation is highly magnified as compared with the actual amount of physical departure of the optical pick-up arrangement from its desired position precisely in alignment with the portion of track being monitored.

Figure 6:
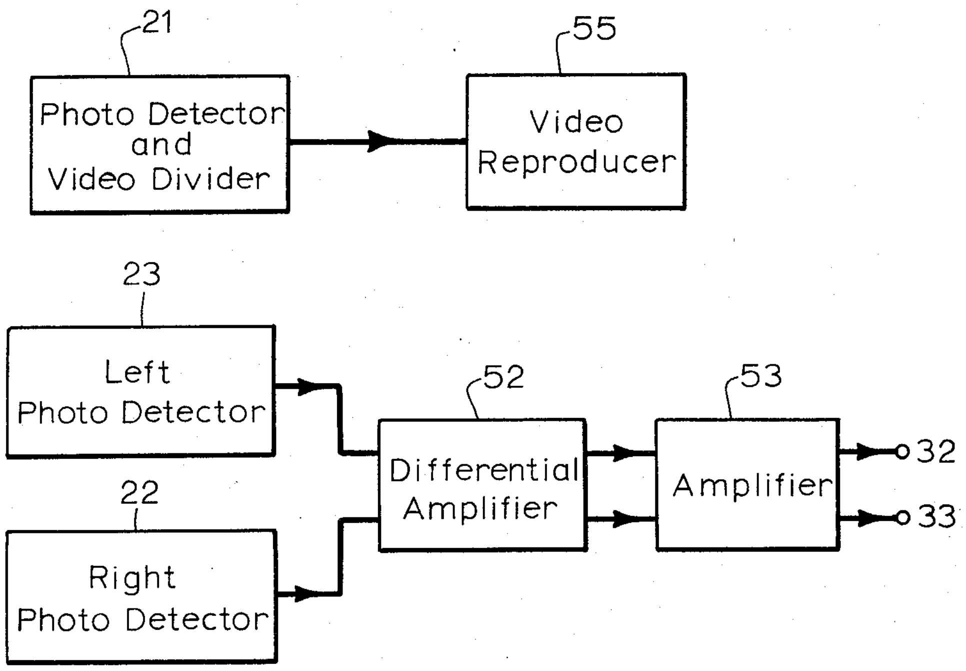
FIG. 6 is a block diagram of an electrical system included with the apparatus of the preceding figures.

The movement of the dark stripe or stripes is in the same direction as that of the narrower one of the two patterns. For example, with slits 50 of mask 44 being more closely spaced than track segments 10 of disc 11, the stripe or stripes move in the direction in which the position of the mask departs from normal. Of course, as a stripe moves in one direction or the other, corresponding variations occur in the electrical output current from photodetectors 22 and 23. Consequently, the magnitude and sign of the difference between the two output currents respectively from photodetectors 22 and 23 constitutes an error signal which represents the relative departure of the optical pick-up assembly laterally from the track portion being monitored. Accordingly, and as shown in FIG. 6, the two electrical output signals from the photodetectors are fed to the input of a differential amplifier 52 so as to develop a control signal in a manner which, preferably after further amplification in an amplifier 53 and upon application to terminal 32 and 33 of transducer 26, effects a compensatory variation in the position of the optical pick-up. That is, in response to movement of the dark stripe or stripes produced as the light in guidance portion 38 is passed through both the slits and the disc sections between the track segments, the arrangement of FIG. 6 completes a servo-control loop having its gain adjusted so that any tendency of the optical pick-up arrangement to depart from its desired position relative to the track portion being monitored is met with a counter-action that keeps the optical pick-up assembly in proper position. Also included in FIG. 6 is a representation of a video reproducer 55 which, as in a television monitor, responds to the decoded signal from video photodetector 21 in order to reproduce the recorded image.

As mentioned earlier, various dimensions in the drawings have been greatly exaggerated. In practice, the light in beam portion 40 is focused so as to define a spot on the track length being monitored that has a diameter of the order of 2 microns. Beneath disc 11, it is preferred that photodetector 21 be positioned as closely as possible to the disc so as to pick up the diverging light as close to the focused spot as possible. Somewhat similarly, the spacing between mask 44 and the upper surface of disc 11 on which the helical track is formed preferably is minimized. For the exemplary system in which there are of the order of three convolutions of the track per mil, the spacing between mask 44 and disc 11 may be of the order of two mils.

As already indicated, the actual monitoring of the light in the focused read-out beam portion 40 may be either by transmission through disc 11 or by reflection from the latter; that is, video photodetector 21 may instead by carried by projection head 14 so as to respond to reflected light. In the case of either the read-out beam or the guidance beam, the relative positions of the effective light source and the photosensitive element or elements may be reversed. Thus, a part or all of the light involved may be directed upwardly through disc 11. Moreover, entirely independent light sources may be utilized for each of the guidance beam and the read-out beam portions, and such sources may be carried entirely within projection head 14. However, for proper development of the deviation-indicative dark stripes, it is necessary that the guidance beam portion that passes through the mask slits and disc spaces be collimated to at least approximately 10°. When a light source is used that does not in itself produce collimated light, the necessary degree of collimation may be obtained, for example, by making the mask comparatively thick with respect to the slit width. While the use of balanced photodetectors responsive to the guidance beam is advantageous, it will be recognized that a single photodetector combined with an edge may be employed instead.

As used herein, the term "light" is intended to include optical radiation in both the visible and invisible regions of the spectrum. The only requirement in this respect, of course, is that the photodetectors respond to the wavelength of radiation employed.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. In a video reproducing system wherein video information is stored optically along a helical track on a rotating disc and an optical pick-up is moved radially of said disc in correspondence with progressive generally uniform radial displacement of a monitored portion of said track, guidance apparatus comprising:

adjusting means responsive to a control signal for varying the position of said pick-up transversely relative to said monitored portion of track;

a mask physically linked to said pick-up, parallel spaced from said disc and having a plurality of optical slits laterally spaced apart to span a plurality of segments of said track and all oriented generally along said segments, the number of said slits being slightly different from the number of said segments in the width of said span;

means for projecting a generally collimated beam of light through said slits and the region of said disc carrying said segments;

detection means responsive to a moire' pattern in said light projected through said slits and disc region for developing signals representive of relative departure of said pickup laterally from said monitored track portion;

and means responsive to said signals for developing said control signal in a manner to effect a compensatory variation in the position of said pickup.

2. A video reproducing system as defined in claim 1 in which said adjusting means is a piezoelectric transducer mechanically coupled to said optical pick-up and responsive to said control signal for effecting physical movement of said pick-up.

3. A video reproducing system as defined in claim 1 in which said slits each have a radius approximately the same as the average radius of said helical track.

4. A video reproducing system as defined in claim 1 in which:

said mask is spaced along said monitored portion of track from said pick-up;

a beam of substantially collimated light is projected along a path generally parallel to said disc and in spatial alignment with said mask and said optical pick-up;

said projecting means includes a partially reflective mirror disposed in the path of said beam for projecting a portion of said beam through said slits and the region of said disc carrying said segments;

an optical element is disposed in the path of said beam for directing another portion thereof toward said monitored portion of said track;

and a lens is included in said system for focusing said other portion of said beam upon said monitored portion of said track.

5. A video reproducing system as defined in claim 1 in which said detection means includes a pair of balanced photodetectors spaced apart in a direction transversely of said monitored portion of said track, and in which said control-signal-developing means includes a differential amplifier responsive to output signals from said pair of photodetectors.

* * * * *